United States Patent [19]

Lambrecht et al.

[11] 4,035,678
[45] July 12, 1977

[54] COOLANT CIRCULATION SYSTEM FOR THE ROTOR OF AN ELECTRIC MACHINE HAVING A SUPERCONDUCTIVE EXCITATION WINDING

[75] Inventors: Dietrich Lambrecht; Erich Weghaupt, both of Mulheim (Ruhr), Germany

[73] Assignee: Kraftwerk Union Aktiengesellschaft, Mulheim (Ruhr), Germany

[21] Appl. No.: 607,901

[22] Filed: Aug. 26, 1975

[30] Foreign Application Priority Data

Sept. 4, 1974 Germany .......................... 2442277

[51] Int. Cl.² ......................................... H02K 9/00
[52] U.S. Cl. ..................................... 310/52; 62/505
[58] Field of Search ............... 310/10, 40, 52, 54, 310/165, 194; 165/47–50; 62/505, 514

[56] References Cited

U.S. PATENT DOCUMENTS

| 2,898,484 | 8/1959 | Krastchew | 310/52 |
|---|---|---|---|
| 3,644,766 | 2/1972 | Hughes | 310/165 |
| 3,648,082 | 3/1972 | MacNab | 310/10 |
| 3,679,920 | 7/1972 | MacNab | 310/10 |
| 3,708,705 | 1/1973 | Tinlin | 310/52 |
| 3,729,640 | 4/1973 | Ross | 310/52 |
| 3,904,901 | 9/1975 | Renard | 310/52 |

Primary Examiner—R. Skudy
Attorney, Agent, or Firm—Herbert L. Lerner

[57] ABSTRACT

Coolant circulation system for the rotor of an electric machine having a superconductive excitation winding and carried by a rotary shaft includes a radially outer cold shield surrounding the superconductive excitation winding, a coolant junction head surrounding the shaft at an end thereof adjacent the excitation winding, the coolant junction head having an inlet communicating with an axial bore formed in the shaft, means for refrigerating a coolant, means for conducting coolant from the refrigerating means through the coolant junction head to the shaft bore, means defining a collection chamber surrounding the shaft and communicating with bore means formed in the shaft for discharging the coolant from the shaft, first cooling channels located in the radially inwardly disposed excitation winding and communicating with the shaft bore, and second cooling channels located in the radially outwardly disposed refrigerating shield, the first and the second cooling channels being serially connected and being successively traversible by the same coolant conducted to the shaft bore.

3 Claims, 1 Drawing Figure

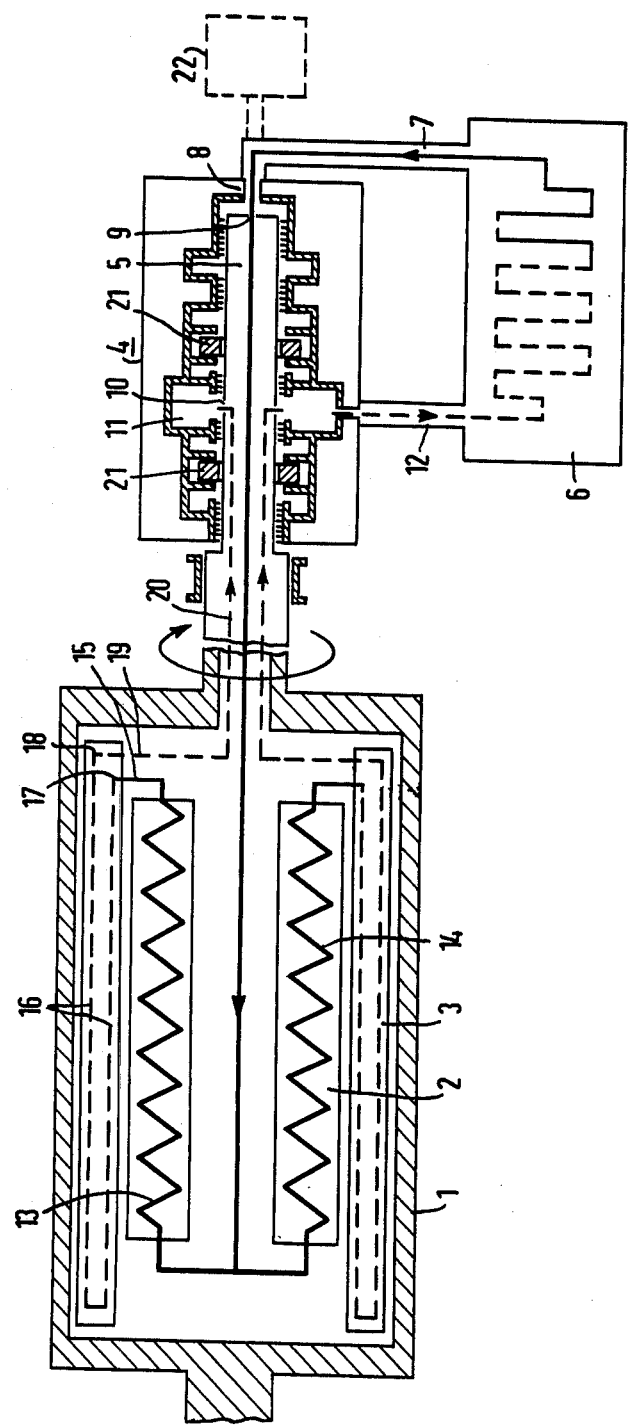

COOLANT CIRCULATION SYSTEM FOR THE ROTOR OF AN ELECTRIC MACHINE HAVING A SUPERCONDUCTIVE EXCITATION WINDING

The invention relates to a coolant circulation loop or system for the rotor of an electric machine, especially a turbogenerator, having a superconductive excitation winding or coil and a cold shield surrounding the winding and having, in turn a vaporizing winding, the coolant circulation system further having a coolant connecting or junction head surrounding the end of the rotor shaft located adjacent the excitation winding, a flow of coolant being fed from a refrigerating machine through the coolant junction head to an axial bore formed in the shaft, and being discharged from the shaft through a collection chamber surrounding the shaft.

A coolant circulation system of the foregoing general type is known from the German Published Non-Prosecuted Application No. DT-OS 2 028 158. Helium, which is employed as the coolant, is compressed in a compressor outside the rotor, according to the German published application, is liquefied in a refrigerating device and is thereafter fed through a coolant junction head to an axial bore formed in the rotor shaft. After the coolant has flowed-through and cooled the superconductive excitation winding, it emerges again into a coolant collection chamber which surrounds the rotor shaft. The aforementioned German published application further teaches that part of the coolant can be branched off within the rotor and applied to cooling a shielding which surrounds the excitation winding.

Difficulties in performing the refrigerating process of the foregoing German published application are produced because of the high cold power or output that is required and the relatively poor processing efficiency of the refrigerating machine and the compressor. Moreover, the supplying of the helium to and the discharge thereof from the rotating rotor shaft and the disposition and installation of the various helium supply and discharge channels within the rotor cause serious difficulties and produce sealing problems.

It is accordingly an object of the invention to provide a coolant circulation system of the foregoing general type wherein, on the one hand, the excitation winding and the refrigerating shield with vaporizing winding surrounding the excitation winding are optimally cooled while, on the hand, the efficiency of the refrigerating process is increased over that of heretofore known corresponding refrigerating processes.

With the foregoing and other objects in view, there is provided, in accordance with the invention, a coolant circulation system for the rotor of an electric machine having a superconductive excitation winding and carried by a rotary shaft comprising a radially outer cold shield surrounding the superconductive excitation winding, a coolant junction head surrounding the shaft at an end thereof adjacent the excitation winding, the coolant junction head having an inlet communicating with an axial bore formed in the shaft, means for refrigerating a coolant, means for conducting coolant from the refrigerating means through the coolant junction head to the shaft bore, means defining a collection chamber surrounding the shaft and communicating with bore means formed in the shaft for discharging the coolant from the shaft, first cooling channels located in the radially inwardly disposed excitation winding and communicating with the shaft bore and second cooling channels located in the radially outwardly disposed refrigerating shield, the first and the second cooling channels being serially connected and being successively traversible by the same coolant conducted to the shaft bore.

Thereby, an inherent or self advancing pressure is producible by the conduction or guidance of the coolant so that, in accordance with another feature of the invention the machine rotor forms the compressor of the refrigerating machine which is connected thereto through the coolant head.

Through such a conduction or guidance of the coolant and construction of the coolant circulation system, the entire compressor line, which would otherwise be required in order to raise the helium to a compression of about 20 bar, may be dispensed with. Since the outlet temperature level of the refrigerating process can thereby be held very low at 80° to 100°K, a higher processing efficiency of the refrigerating machine and accordingly a significant economy in plant costs is achieved with the rotor acting as cold gas compressor, in accordance with a further feature of the invention.

Other features which are considered as characteristic for the invention are set forth in the appended claims.

Although the invention is illustrated and described herein as embodied in a coolant circulation system for the rotor of an electric machine having a superconductive excitation winding, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single feature of the drawing which is a diagrammatic longitudinal sectional view of the coolant circulatory loop for the rotor of an electric machine with superconductive exciter winding.

Referring now to the drawing, there is shown therein, a drum rotor 1 vacuum-tightly sealed againt the outer atmosphere and provided, in the interior thereof, with a superconductive excitation winding 2 and, coaxially thereto, shield 3 with a vaporizer coil or winding. The rotor 1 is supported on a shaft having an end 5 at the exciter side of the rotor 1, and the end 5 is enclosed by a coolant connecting or junction head 4 through which helium is supplied to the rotor shaft and discharged therefrom. The coolant is conducted from a refrigerating machine 6 through a line 7 into a coolant supply chamber 8 and, from the latter into an axial bore 9 formed in the shaft 5 of the motor 1. The coolant, which is then heated as it passes through the superconductive exciter windings 2 and the cold shield 3, discharges from the shaft end 5 through radial bores 10 into a coolant path collection chamber 11 surrounding the shaft end 5, and if fed therefrom through a line 12 to the refrigerating machine 6.

With such a construction and coolant conduction, a coolant circulation having the following course and the following essential advantages is produced for a rotation of the rotor at nominal or rated rotary speed:

Helium employed as the coolant leaves the refrigerating machine 6, for example with a temperature of approximately 4.2° K and at a pressure of about 1.0 to 1.1 bar and, under those conditions, travels through the line 7 and the coolant supply chamber 8 into the axial inlet flow channel 9 of the shaft 5. The helium is then fed in liquid or slightly two-phase state to the junction point 13 of the superconductive winding or coil 2. The helium flows though the winding 2 in a multiplicity of parallel channels 14 and is then fed through radial connecting lines 15 to the coolant channels 16 of the cold shield 3, which is connected in series, from the standpoint of cooling technology, with the excitation winding 2. At the junction point 17, whereat the helium enters the cooling channels 16 of the refrigerating shield 3, the helium has a temperature of about 5° K and, due to the rotation of the rotor 1 and the radial disposition of the refrigerating shield 3, has taken on a pressure of about 23 bar. The helium then changes completely to the gaseous phase in the cooling channels 16 of the refrigerating shield 3. This phase change is produced by the high cooling output as a result of the heat flowing in from the outside due to heat conduction. At the end of the refrigerating shield 3, namely at the outlet point 18, the helium temperature is at about 80° to 100° K while the helium pressure, as a result of the flow resistance in the cooling channels 16, has dropped to about 21 bar. Through radial lines 19, the helium gas is conducted into an outlet ring channel 20 which surrounds the axial inlet flow channel 9. As a result of the low density of the gas, when compared to the condition thereof at the junction point 17, only a slight rotation counter-pressure is produced. Due to the $\gamma$ effect of the gas and also due to the effect of the geometric rotor construction, there is available at the rotor outlet 10 a self advancing pressure of the rotor of about 20 bar at a temperature of from about 80° to 100°K for the refrigerating equipment. This advancing pressure is determined substantially by the radial disposition of the refrigerating shield 3 i.e. from the radial spacing of the outlet point 18 from the outlet point 10 or the inlet point 17 from the inlet point 8 as well by the difference of the specific weight of the helium at both respective locations. Through this self advancing action of the rotating rotor, a separate compressor for the refrigerating machine 3 can be dispensed with, because the required compressive force is then applied solely by the rotation of the rotor, whereby considerable economies and, additionally, an improved processing efficiency are possible.

Whereas only a quite low preliminary pressure prevails in the coolant supply chamber 8, the gas pressure in the coolant collection chamber 11 is very high. The shaft 5 must be sealed at both sides thereof against this very high pressure. For this reason contact-free and wear-free liquid seals 21 are advantageously used, the seals 21 being disposed at both sides of the coolant collection chamber 11. The sealing medium employed in the liquid seals 21 is pressure oil but may be any liquid that is suited especially for sealing against penetration by helium.

The description of the functioning of the coolant circulation system according to the invention is related, however, only to the operating condition wherein the advancing pressure available at the rotor outlet 10 is dependent upon the state of aggregation of the helium. The start-up of such a generator from standstill is thus possible only with the aid of a helium cryostat 22, schematically shown in broken lines in the figure, in which helium has been stored before start-up.

There is claimed:

1. Coolant circulation system for the rotor of an electric machine having a superconductive excitation winding and carried by a rotary shaft comprising a radially outer cold shield surrounding the superconductive excitation winding, a coolant junction head surrounding the shaft at an end thereof adjacent the excitation winding, said coolant junction head having an inlet communicating with an axial bore formed in the shaft, means for refrigerating a coolant, means for conducting liquid coolant from said refrigerating means through said coolant junction head to said shaft bore, means defining a collection chamber surrounding the shaft and communicating with bore means formed in the shaft for discharging the coolant from the shaft, first cooling channels located in the radially inwardly disposed excitation winding and communicating with said shaft bore, and second cooling channels located in said radially outwardly disposed refrigerating shield, said first and second cooling channels being serially connected and being successively traversible by the same coolant conducted to said shaft bore, said coolant flowing through said shaft bore and said serially connected cooling channels changing to the gaseous phase and discharging from said second channel at a pressure higher than said liquid coolant entering said shaft bore, said machine rotor forming a cold gas compressor for said refrigerating means and is connected thereto through said coolant junction head.

2. Coolant circulation system according to claim 1 wherein the radial disposition of said refrigerating shield is dependent upon the required compressive force of said refrigerating machine.

3. Coolant circulation system according to claim 1 including contactless liquid sealing means sealing a said coolant junction head with respect to the rotor shaft.

* * * * *